(12) United States Patent
Poglavec

(10) Patent No.: US 7,815,008 B2
(45) Date of Patent: Oct. 19, 2010

(54) FRAME CONSTRUCTION AND ROAD VEHICLE PROVIDED WITH SUCH A FRAME CONSTRUCTION

(76) Inventor: Sandy Augustinus Maria Poglavec, Rijksweg 353, B-3650 Dilsen-Stokkem (BE)

( * ) Notice: Subject to any disclaimer, the term of this patent is extended or adjusted under 35 U.S.C. 154(b) by 454 days.

(21) Appl. No.: 11/818,096

(22) Filed: Jun. 13, 2007

(65) Prior Publication Data

US 2007/0296196 A1    Dec. 27, 2007

(30) Foreign Application Priority Data

Jun. 14, 2006   (NL)   .................................... 2000101

(51) Int. Cl.
*B62K 5/00* (2006.01)
(52) U.S. Cl. ...................... 180/311; 180/908; 280/781; 280/785; 280/787
(58) Field of Classification Search ................ 180/908, 180/311, 312; 280/787, 781, 785
See application file for complete search history.

(56) References Cited

U.S. PATENT DOCUMENTS

| | | | | |
|---|---|---|---|---|
| 3,470,768 A | * | 10/1969 | Percifield et al. ............ | 475/230 |
| 3,610,358 A | | 10/1971 | Korff | |
| 3,768,336 A | * | 10/1973 | Wharton ...................... | 475/252 |
| 3,827,705 A | | 8/1974 | Templeton | |
| 4,388,842 A | * | 6/1983 | Marcell ...................... | 475/237 |
| 4,650,203 A | | 3/1987 | Tsutsumikoshi | |
| 4,667,765 A | * | 5/1987 | Tomoyuki ................... | 180/311 |
| 4,735,275 A | * | 4/1988 | Tsukahara et al. .......... | 180/215 |
| 4,770,262 A | * | 9/1988 | Yasunaga et al. ........... | 180/68.1 |
| 5,236,060 A | | 8/1993 | Huber | |
| 5,630,601 A | | 5/1997 | vom Braucke | |
| 6,085,857 A | * | 7/2000 | Horiuchi ..................... | 180/292 |
| 6,412,856 B1 | * | 7/2002 | Kajikawa et al. ....... | 296/203.01 |
| 6,702,058 B2 | * | 3/2004 | Ishii et al. ................... | 180/311 |
| 6,732,830 B2 | * | 5/2004 | Gagnon et al. .............. | 180/291 |
| 6,783,158 B2 | | 8/2004 | Nakagawa et al. | |
| 7,306,069 B2 | * | 12/2007 | Takeshima et al. .......... | 180/312 |
| 7,510,037 B2 | * | 3/2009 | Oshima et al. ............. | 180/68.4 |
| 2002/0117843 A1 | | 8/2002 | Rasidescu et al. | |

FOREIGN PATENT DOCUMENTS

| | | | |
|---|---|---|---|
| AT | 178544 | | 5/1954 |
| BR | 8600806 | | 9/1987 |
| DE | 2331495 | | 6/1974 |
| JP | 60078829 | | 5/1985 |
| JP | 60-213577 | * | 10/1985 |
| JP | 1-109186 A | * | 4/1989 |
| JP | 1-197190 A | * | 8/1989 |
| JP | 1-204880 A | * | 8/1989 |

* cited by examiner

*Primary Examiner*—Ruth Ilan
(74) *Attorney, Agent, or Firm*—The Webb Law Firm

(57) ABSTRACT

The invention relates firstly to a frame construction for a road vehicle, comprising a main frame of, for example, a motorcycle. This main frame is on the front edge provided with a fork head. A front frame is also provided, which is suspended from the fork head. In addition, the front frame is fastened to the main frame by means of further, separate front suspension means. Further, a rear frame can also be provided, which is provided with rear suspension means standardly present on the main frame. The rear frame can possess a drive train having a differential, the housing of which can be driven by means of a chain or pulley transmission.

13 Claims, 5 Drawing Sheets

FRAME CONSTRUCTION AND ROAD VEHICLE PROVIDED WITH SUCH A FRAME CONSTRUCTION

The invention relates to a frame construction for a road vehicle, comprising a main frame, which on the front edge is provided with a fork head and with front suspension means and which on the rear edge is provided with rear suspension means, a front frame, which is rigidly connected to the main frame and which is suspended from the front suspension means, and a rear frame, which is suspended from the rear suspension means.

Such a frame construction is known from Brazilian patent application 8.600.806. The rear frame thereof is resiliently suspended in relation to the main frame. Such a construction possesses a high unsprung weight, which is not beneficial to the roadholding.

A further frame construction is known from American U.S. Pat. No. 6,783,158. In this known frame construction, a main frame is used which can be used both as a two-wheeled, as a three-wheeled and as a four-wheeled road vehicle. The front frame is in this case rigidly suspended from the main frame. The wheels are resiliently suspended from the front frame. The points of attachment of the front frame are located on the lowermost portion of the main frame. A same type of suspension appears in the realization of the two-wheeled, three-wheeled and four-wheeled embodiment. Such a frame construction is especially suitable for lighter vehicles.

The object of the invention is to realize a frame construction of this type, comprising a main frame provided with a fork head, as known from Brazilian patent application 8.600.806, such that this provides better roadholding and is also suitable for heavier vehicles. This object is achieved by the rear frame being rigidly suspended from the main frame. Preferably, the rear frame has on either side resiliently supporting suspension constructions for the suspension of a respective wheel. In addition, the rear frame can comprise drive means for driving the associated wheels. The drive means can comprise a differential.

The points of attachment of the front frame are located on the lowermost and uppermost portions of the main frame, which favourably influences the stiffness and stability of the frame construction. The rigid connection which is thus obtained between the front frame and the main frame results in a robust frame construction, which is suitable for heavier vehicles. The connection between the front frame and the fork head can be variously achieved, though according to a particularly efficient embodiment the front frame possesses for this purpose a freely projecting frame piece accommodated in the fork head. Furthermore, the rear frame, too, can be rigidly suspended from the main frame. An altogether rigid and robust construction is thereby obtained, which provides particularly good riding characteristics.

In the frame construction as known from the above-stated American patent specification, a main frame is used which possesses a flat base on which the rider can perch with his feet. Furthermore, in the main frame which is thus used, a more or less chair-like seat can be used, such that the rider can mount it in the same way as occurs with a scooter. Such a main frame is suitable for lighter applications, as has already been mentioned above. Since, however, the frame construction according to the invention relates to heavier vehicles, such a main frame would be less suitable. According to the invention, a main frame is hence used which is realized as a motorcycle frame. Such a motorcycle frame comprises a saddle bar which extends rearwards from the fork head. The rider must therefore sit astride such a motorcycle frame, on the saddle present on the saddle bar.

Such a motorcycle frame comprises two front frame bars extending downwards from the fork head. To these two front frame bars and the fork head, the front frame can be connected. Furthermore, such a motorcycle frame possesses two rear frame bars extending downwards from the saddle bar, which means that the rear frame can be connected to both rear frame bars.

Furthermore, the front frame can comprise on either side resiliently supporting suspension constructions for the suspension of a respective wheel, whilst the front frame can also comprise steering means for steering the wheels.

The invention further relates to a road vehicle comprising a frame construction as described above. Such a road vehicle possesses wheels, which are suspended from the suspension constructions, and also steering means for steering the wheels suspended from the front frame, as well as a drive train for driving the wheels suspended from the rear frame. This drive train can comprise a drive source, such as an internal combustion engine, suspended from the main frame. Preferably, the drive train comprises a chain or belt transmission as is usual in motorcycles, and a differential provided with a chain wheel or pulley.

The invention further relates to a kit comprising a main frame, which on the front edge is provided with a fork head and with front suspension means and which on the rear edge is provided with rear suspension means, and a front frame provided with coupling means for the suspension thereof from the front suspension means and a frame piece which can be coupled to the fork head, as well as a rear frame provided with coupling means for the rigid suspension thereof from the rear suspension means.

As described above, the front frame is likewise suspended from front suspension means of the main frame. These can be suspension means which are standardly present on the main frame, for example suspension means used for the suspension of the power source, the pedals, protective bars and the like. Reference has also been made above to rear suspension means on the main frame, for the suspension of the rear frame. The rear suspension means, too, can be standardly present on the main frame.

The invention will be further explained with reference to an illustrative embodiment represented in the figures.

Figure 1:
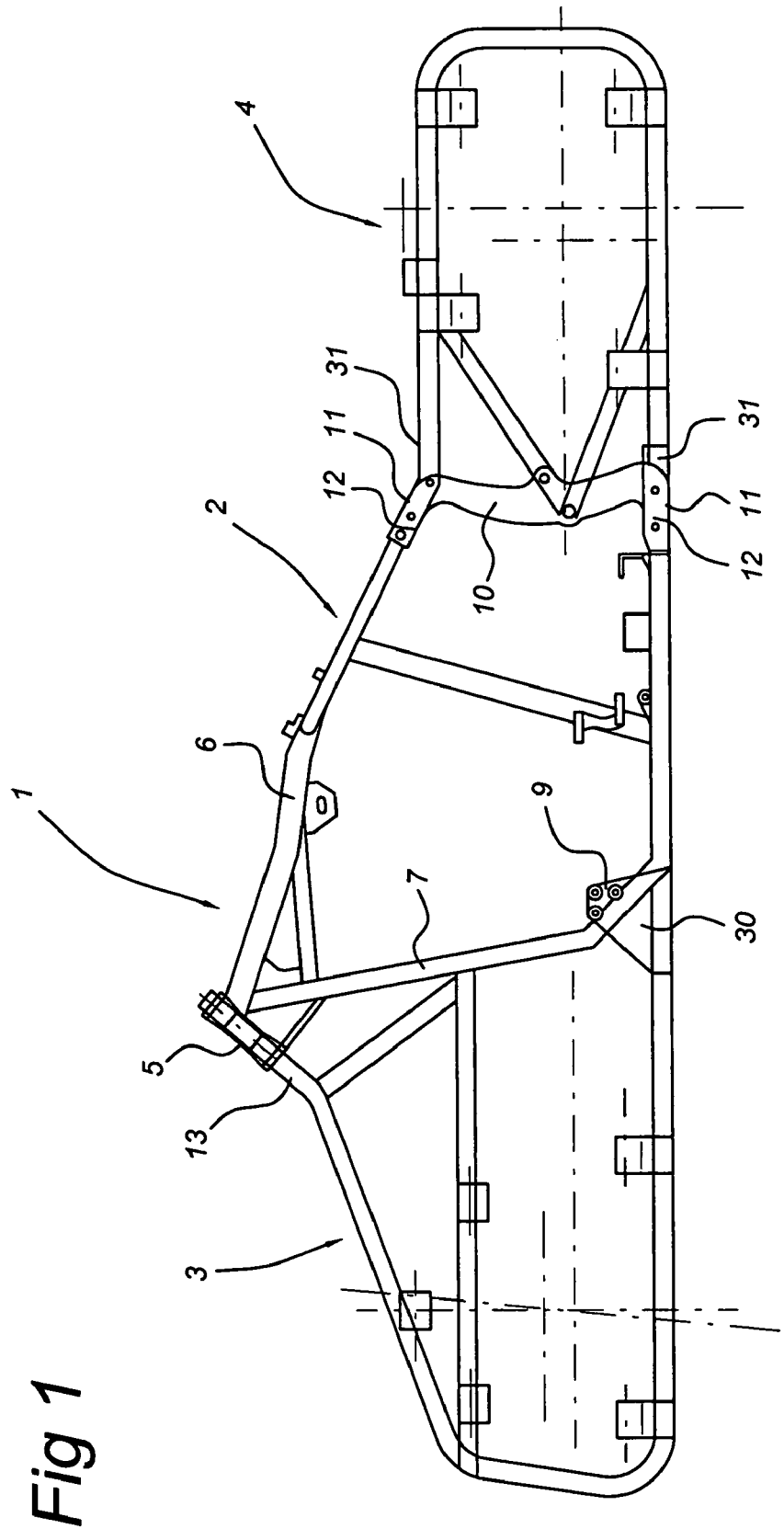
FIG. 1 shows a side view of a frame construction according to the invention.
Figure 2:
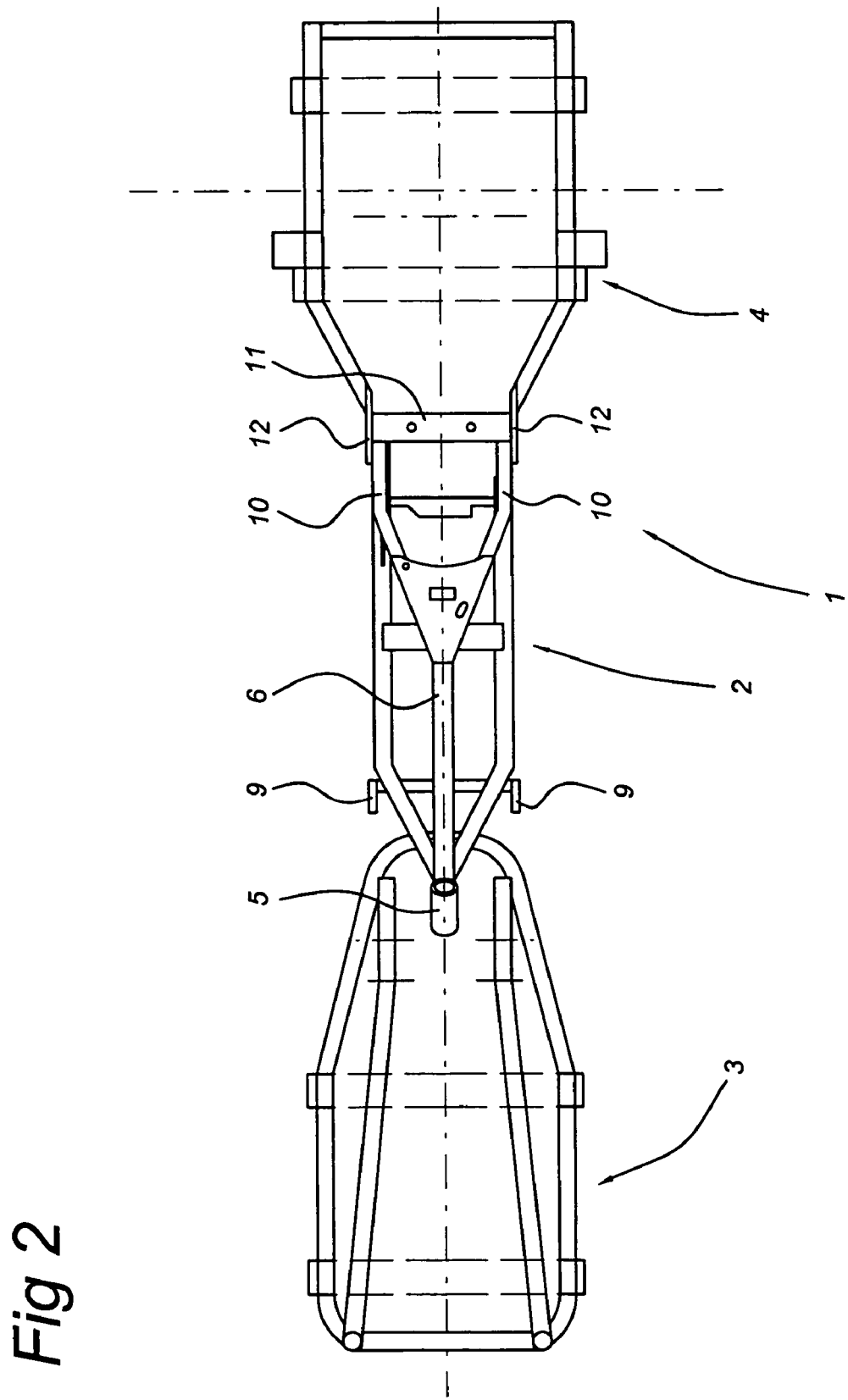
FIG. 2 shows a top view of the frame construction.
Figure 3:
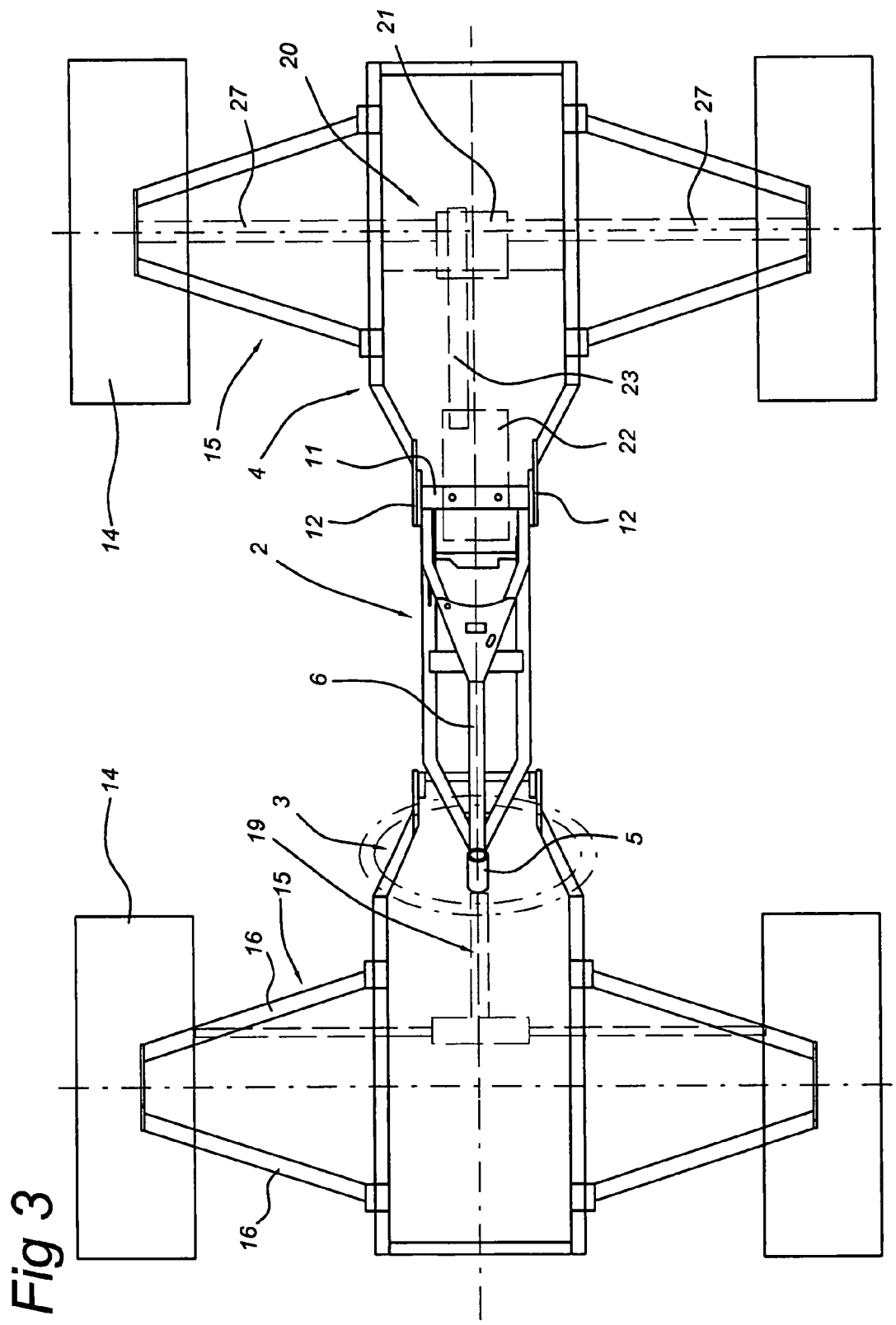
FIG. 3 shows a top view of a vehicle according to the invention, having the frame construction according to FIGS. 1 and 2.
Figure 4:
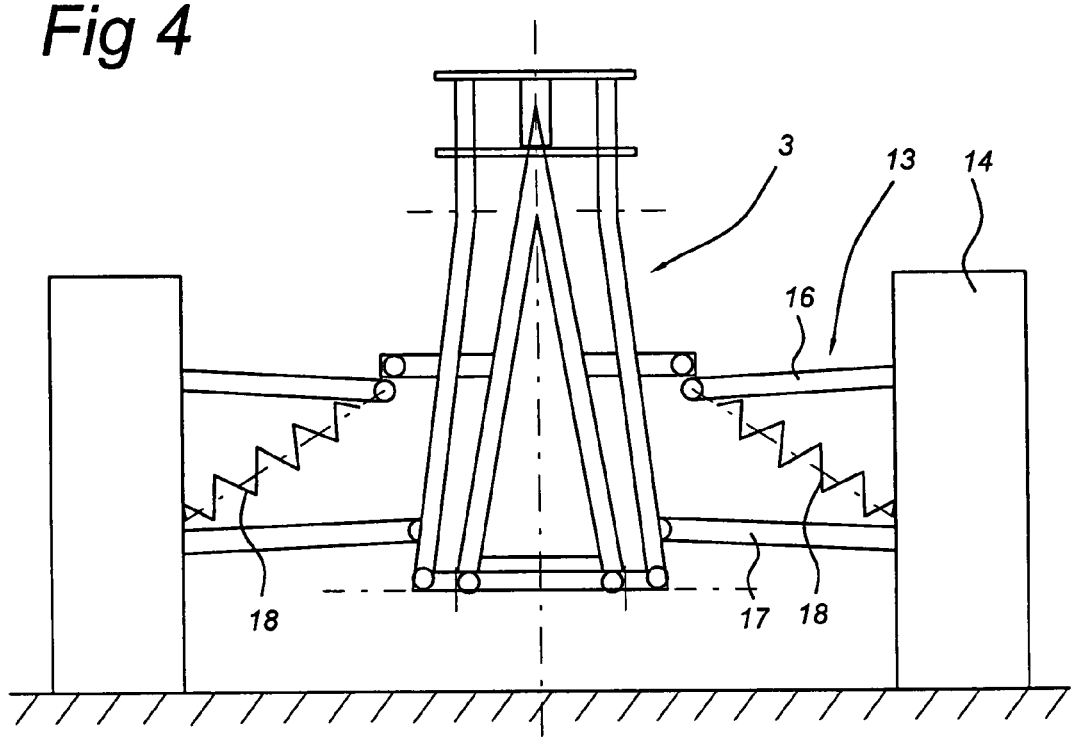
FIG. 4 shows a front view of the vehicle according to FIG. 3.
Figure 5:
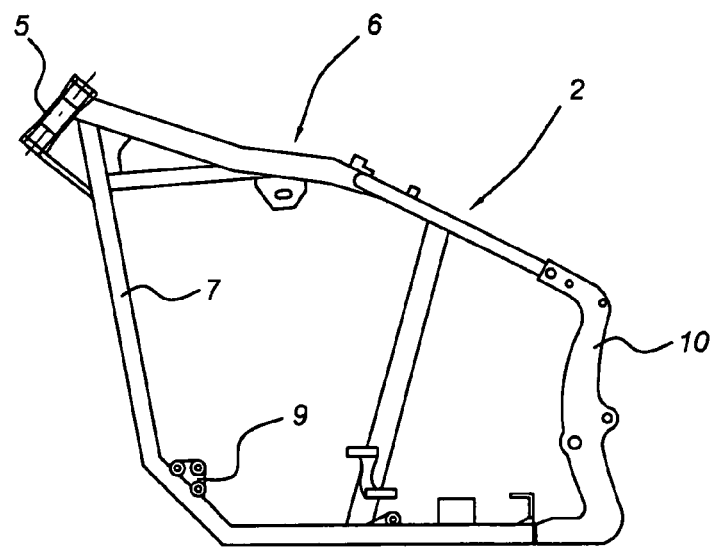
FIG. 5 shows a side view of a motorcycle frame as used in the frame construction according to FIGS. 1 and 2.
Figure 6:
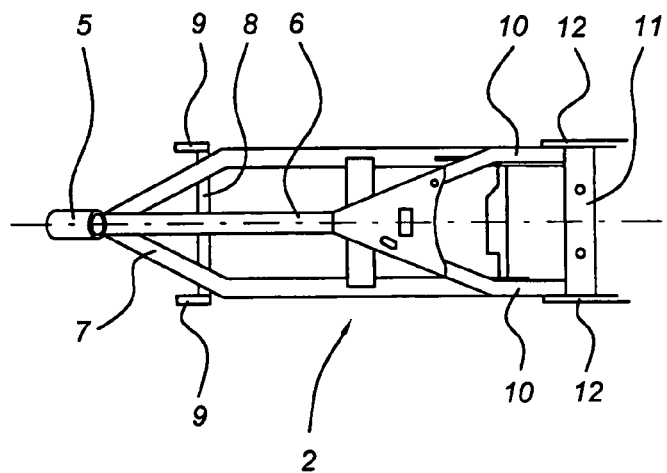
FIG. 6 shows a top view of the motorcycle frame according to FIG. 5.

The frame construction 1 represented in FIGS. 1 and 2 is made up of the motorcycle frame, denoted in its entirety by 2, the front frame, denoted in its entirety by 3, and the rear frame, denoted in its entirety by 4. The motorcycle frame 2, which in FIGS. 5 and 6 is represented separately, comprises a fork head 5 and a saddle bar 6 extending rearwards in relation to the fork head 5. Extending downwards in relation to the fork head 5 are the front frame bars 7, which, as can be seen in the top view of FIG. 6, run directed away from one another in this direction. Fastened to the lowermost end of these front frame bars 7 is a transverse beam 8, at the extremities of which the fastening means 9 are provided. From the saddle bar 6, the rear frame bars 10 run downwards away from one another. These rear frame bars 10 are mutually connected by means of the transverse beam 11. At the level of this transverse beam 11, fastening means 12 are likewise provided.

As represented in FIGS. 1 and 2, the front frame 3 is fastened to the fastening means 9. The front frame 3 further possesses a freely projecting frame piece 13, which is accommodated in the fork head 5. As a result of these measures, the front frame 3 is stiffly or rigidly fastened to the motorcycle frame 2. The rear frame 4 is stiffly fastened to the fastening means 12. An entirely stiff, rigid frame construction 1 is thereby obtained.

Both from the front frame 3 and from the rear frame 4, wheels 14 are suspended by means of suspension means 15 which are known per se. These suspension means 15 comprise pairs of bars 16, 17, lying one above the other, and spring/shock absorber devices 18 (represented diagrammatically). A steering device 19 and a drive train 20 are present. This drive train 20 comprises an internal combustion engine 22, which is coupled via a chain or belt transmission 23 to the differential 21.

Figure 7:
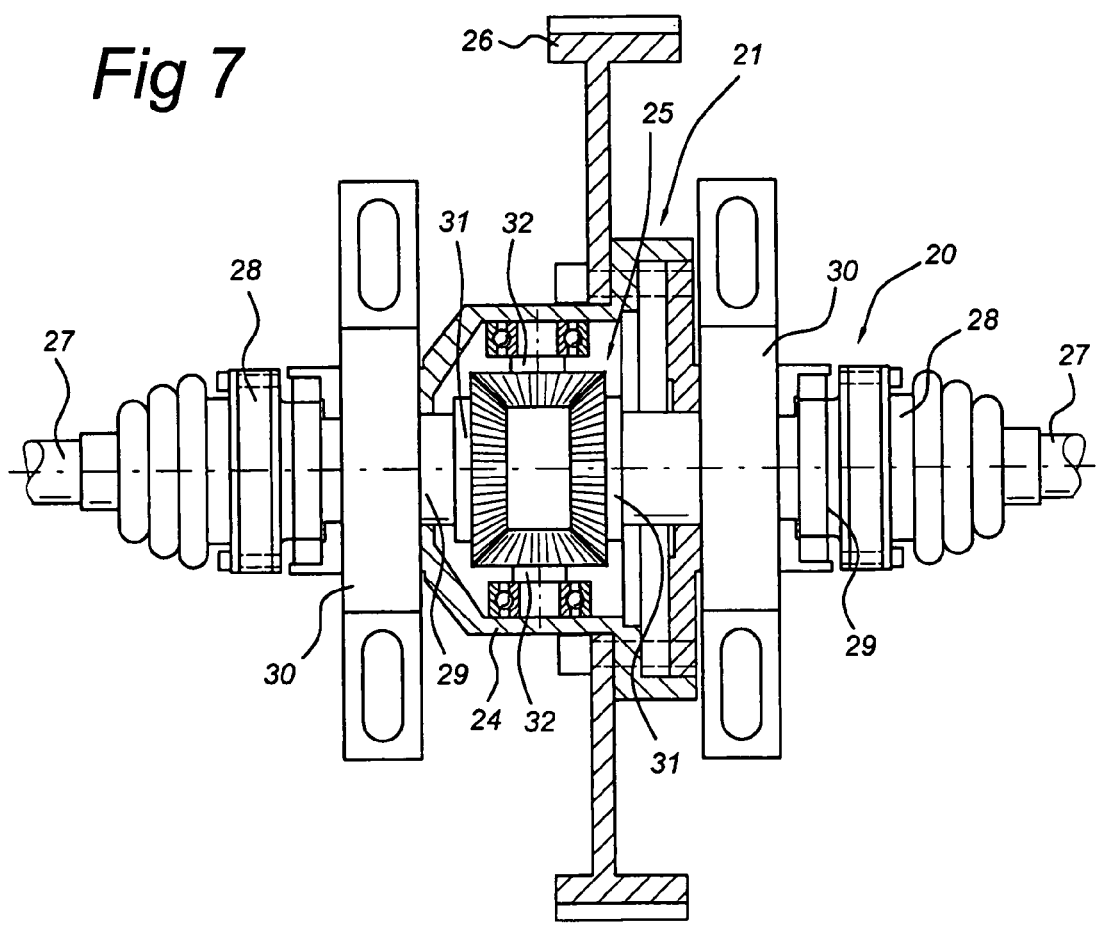
FIG. 7 shows a detail of the drive train with differential as accommodated in the rear frame.

In the partially exploded view of FIG. 7, the differential 21 of the drive train 20 is represented. The differential 21 comprises a housing 24, in which a standardly realized production differential 25 is accommodated. Fastened to the outer side of the housing 24 is the pulley wheel or chain wheel 26, over which a pulley or chain (not shown) is guided. In addition, the two drive axles 27 are represented, which, via homokinetic couplings 28, are connected to the axle journals 29 mounted in the bearing housings 30. Fastened to the mutually facing ends of the axle journals 29, which emerge in the production differential 25, are the usual helical gears 31. In a likewise known manner, the likewise helical auxiliary gears 32 are likewise suspended in freely rotating arrangement in the production differential. These gears 31, 32 are mutually engaged.

By setting the housing 24, and hence the production differential 25, in rotation by means of the chain or pulley transmission, it is also possible to obtain the desired driving of the drive axles 27 and of the wheels fastened thereto.

The invention claimed is:

1. A frame construction for a road vehicle, comprising:
   a main frame including:
      a front edge having a fork head and a front fastening arrangement; and
      a rear edge having a rear fastening arrangement;
   a front frame rigidly connected to the main frame, wherein the front frame is suspended from the front fastening arrangement, and wherein the front frame includes a freely projecting frame piece accommodated in the fork head; and
   a rear frame suspended from the rear fastening arrangement, wherein the rear frame is rigidly suspended from the main frame.

2. The frame construction according to claim 1, wherein the rear frame comprises on either side thereof, resiliently supporting suspension constructions for suspension of a respective wheel.

3. The frame construction according to claim 2, wherein the rear frame comprises drive means for driving the associated wheels.

4. The frame construction according to claim 3, wherein the drive means comprises a differential.

5. The frame construction according to claim 2, wherein the front frame comprises steering means for steering the wheels.

6. The frame construction according to claim 1, wherein the main frame is a motorcycle frame having a saddle bar rearwardly extending from the fork head.

7. The frame construction according to claim 6, wherein the motorcycle frame comprises two front frame bars downwardly extending from the fork head, and wherein the front frame is connected to both front frame bars.

8. The frame construction according to claim 6, wherein the motorcycle frame comprises two rear frame bars downwardly extending from the saddle bar, and wherein the rear frame is connected to both rear frame bars.

9. The frame construction according to claim 1, wherein the front frame comprises on either side thereof, resiliently supporting suspension constructions for suspension of a respective wheel.

10. A road vehicle, comprising:
    a frame construction comprising:
    a main frame including:
       a front edge having a fork head and a front fastening arrangement; and
       a rear edge having a rear fastening arrangement;
    a front frame rigidly connected to the main frame, wherein the front frame is suspended from the front fastening arrangement, wherein the front frame comprises on either side thereof, resiliently supporting suspension constructions, wherein a respective wheel is suspended from each of the suspension constructions, and wherein the front frame includes a freely projecting frame piece accommodated in the fork head;
    a rear frame suspended from the rear fastening arrangement, wherein the rear frame is rigidly suspended from the main frame, wherein the rear frame comprises on either side thereof, resiliently supporting suspension constructions, wherein a respective wheel is suspended from each of the suspension constructions;
    steering means for steering the wheels suspended from the front frame; and
    a drive train for driving the wheels suspended from the rear frame.

11. The road vehicle according to claim 10, wherein the drive train comprises an internal combustion engine suspended from the main frame.

12. The road vehicle according to claim 10, wherein the drive train comprises:
    a chain or belt transmission; and
    a differential having a chain wheel or a pulley.

13. The road vehicle according to claim 12, wherein the chain wheel or the pulley is fastened to the housing of the differential.

* * * * *